April 18, 1939.    H. THOMA    2,154,710
POWER TRANSMISSION
Filed July 22, 1933    3 Sheets-Sheet 1

INVENTOR
HANS THOMA
BY
ATTORNEY

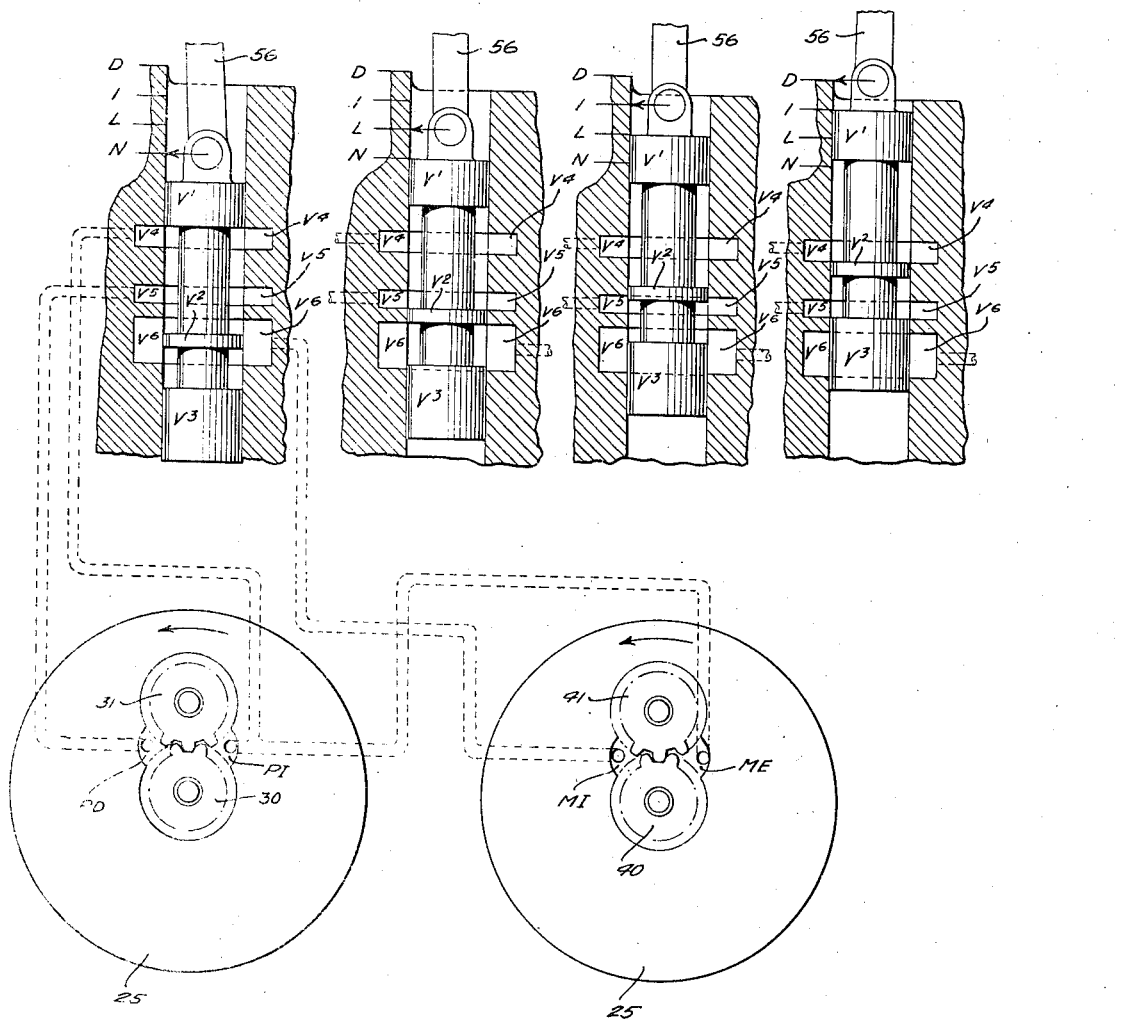

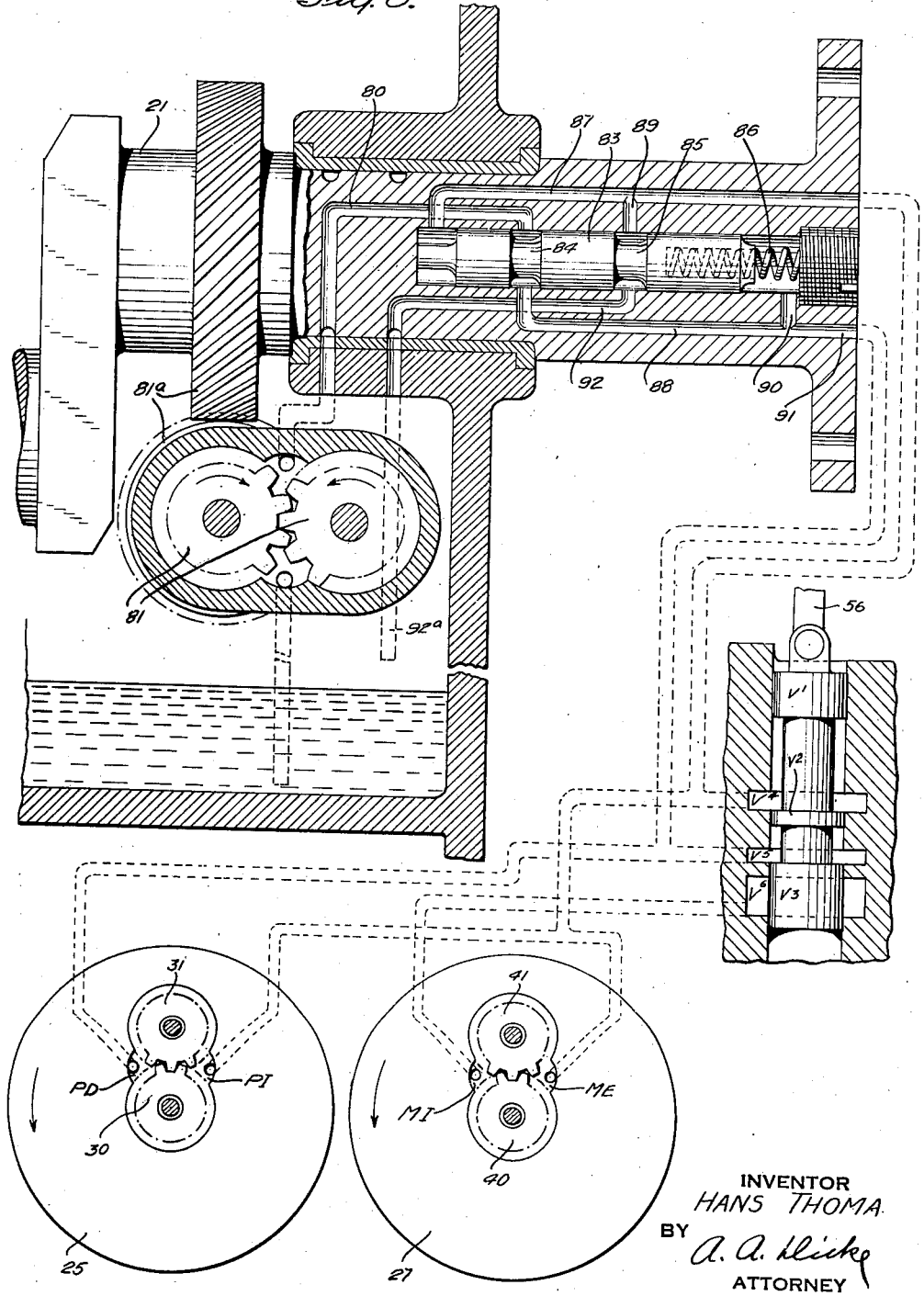

Patented Apr. 18, 1939

2,154,710

UNITED STATES PATENT OFFICE 2,154,710

POWER TRANSMISSION

Hans Thoma, Karlsruhe, Baden, Germany

Application July 22, 1933, Serial No. 681,695
In Germany August 4, 1932

47 Claims. (Cl. 74—293)

This invention relates to improvements in power transmissions, and has for an object to provide a transmission device adapted to perform the functions of the usual clutch and transmission mechanism of automobiles, although the invention is capable of application to aeroplanes, boats, ships, locomotives, machine tools and any other devices where it is desired to control the utilization of power delivered by a prime mover. Among the requirements to be satisfied by such devices is that the energy delivered by a power supply shaft is transmitted to a power delivery shaft at variable speeds and with a torque varying inversely as the ratio of the speed of the power delivery shaft to the speed of the power supply shaft.

It is another object of this invention to secure these results by hydraulic means consisting of a hydraulic pump which at certain times delivers a fluid such as oil to a hydraulic motor, and vice versa.

A further object is the provision in a hydraulic transmission mechanism of a hydraulic displacement device which under varying conditions operates as a pump, as a hydraulic coupling, as a hydraulic motor, or merely idles.

A further object is the provision in a hydraulic transmission mechanism of a hydraulic displacement device which under varying conditions operates as a motor, as a hydraulic coupling; as a pump or merely idles.

Another object is the provision of suitable valve mechanism for controlling the flow of the working fluid.

Another object is the provision of such a transmission mechanism so constructed and arranged that the major portion of the mechanism rotates at the same speed as the power supply shaft so that said mechanism will serve the purpose of the usual flywheel necessary in connection with certain prime movers such as internal combustion engines.

Other objects are the provision of gear connections interposed between said pump and said motor, which gear connections may be disabled or enabled as required.

Another object is to provide such a hydraulic transmission which may be manually controlled to provide a plurality of speed-torque ratios under manual control but which can be readily adapted for automatic operation under the control of speed responsive devices.

Another object is to provide such a transmission furnishing at least three speed-torque ratios with only two hydraulic displacement devices.

Other objects are to improve the construction, to reduce the cost thereof and to provide such a mechanism which is reliable and durable, and operates with high over all efficiency.

Another object is to provide such a transmission mechanism adapted for cooperation with a mechanical transmission means of known or suitable construction.

The characteristics of the present invention are exemplified by the device shown in the accompanying drawings, wherein Fig. 1 represents an illustrative embodiment of the invention in generally vertical longitudinal section.

Fig. 4 is a schematic view showing the control valve in the neutral position, i. e., where no power is transmitted.

Fig. 5 shows the valve only in the position where power is transmitted at a reduced speed ratio and an increased torque ratio.

Fig. 6 shows the valve in position to cause the transmission of power at an intermediate speed-torque ratio.

Fig. 7 shows the valve in position for direct drive of the power delivery shaft by the power supply shaft.

Fig. 8 is a partly schematic view similar to Fig. 4 with the control valve in direct drive position and also showing an oil supply pump and an automatic valve for controlling the change of the working fluid.

Figure 1:
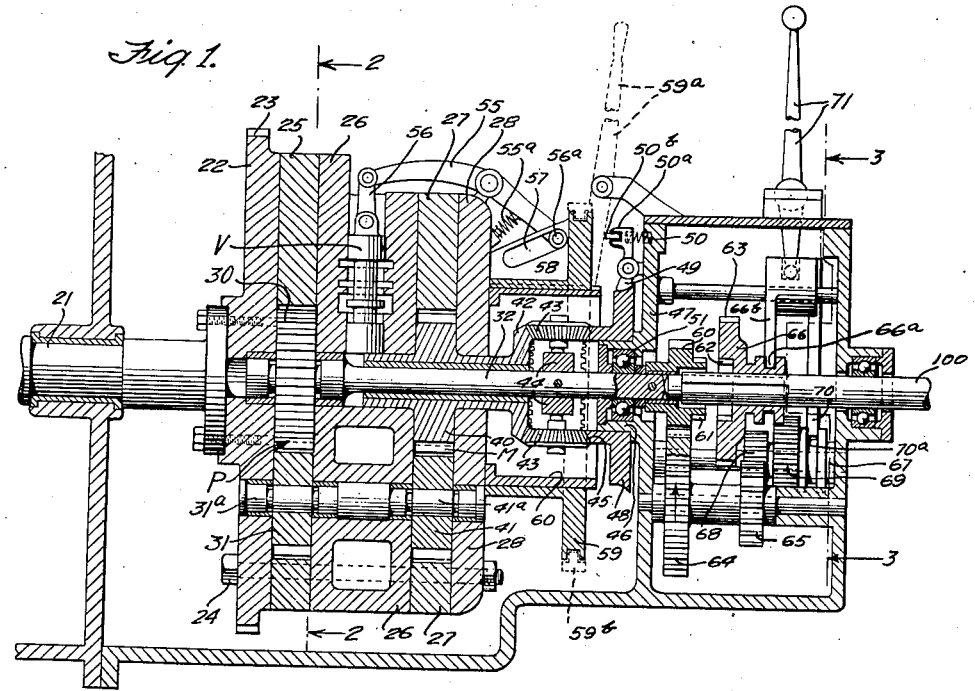

In said drawings, the numeral 21 represents a power supply shaft which may be any means for delivering power to the transmission and which, when the transmission is used for automobiles, may be the usual crank shaft of the motor. Firmly attached thereto is the disc 22 which may be provided with gear teeth 23 to cooperate with the usual starting motor of the automobile. Firmly attached to said disc 22 as by a series of bolts 24 are the plates 25, 26, 27 and 28. In the form illustrated, the hydraulic displacement device, generally indicated by the numeral P, is under some conditions a pump of the gear type and consists of the central gear 30 meshing with one or more gears 31, in the present instance shown as three in number. The pump gear 30 is journaled coaxially with the shaft 21 and is connected for rotation with the power delivery shaft 32. The plate 25 is cut away at its center to provide clearance for the pump gear 30 and also has three preferably equally spaced circular clearance spaces for receiving the gears 31. Said plate 25 is also provided with clearance spaces PI and PD which serve as fluid passages. It will be readily understood that any relative rotation of the gear 30 to the plate 25 will cause a rotation of the gear 30 relative to the gears 31 whereby the gears 30 and 31 will operate as a triple fluid pump. The rearward side of said fluid pump P is closed by the plate 26 which may carry one or more valves generally designated V.

The hydraulic displacement device generally designated M, as shown, acts under certain conditions as a motor and comprises the gear 40 mounted for free rotation about the shaft 32 and between the plates 26 and 28. Said plates 26 and 28 are separated by the plate 27 which has central cut-out portions similar to those in plate 25. Surrounding said gear 40 are one or more gears 41 (here shown as three in number), each meshing with the gear 40. The gears 31 and 41 are respectively journaled upon shafts 31ª and 41ª mounted in and supported by the discs 22, 26 and 28 so that the gears 31 and 41 rotate with the shaft 21. Shafts 31ª and 41ª may be formed as one shaft. A planetary gearing of suitable form and construction is provided for connecting the shaft 32 and gear 40 at certain times. This may consist, as shown, of one or more bevel gears 43 carried by bearing studs 44 rigidly attached to the shaft 32. These bevel gears cooperate at one side with the bevel gear 42 rigidly connected with gear 40 and on the other side with the bevel gear 45 mounted for rotation upon the sleeve portion 46 which may form a part of the transmission housing 47. Any suitable means may be provided for locking or holding said gear 45 in relation to the transmission housing 47. This may consist in forming the gear sleeve with the outwardly extending flange 48 cooperating with a locking or braking pawl 49 mounted upon the transmission housing 47 and which may be normally urged in a counter-clockwise direction by suitable means such as the spring 50. The periphery of the flange 48 may be provided with ratchet teeth cooperating with the pawl 49, in which event, the rotation of the gear 45 will be positively blocked, or said periphery may be smooth so that the arrest of the gear 45 will be accomplished by friction. Under certain conditions, the said pawl 49 may be rocked against the action of spring 50 to free the gear 45 for rotation. The power delivery shaft 32 is carried by a bearing at its rear end such as the ball bearing 51.

Each of the valves V is preferably connected to levers 55 by means of links 56. The rearward end of said levers are shown as formed with studs 56ª, preferably provided with anti-friction rollers, each bearing in a cam slot 57 formed in a plate 58 rigidly connected with the disc 59, which disc and plate are mounted for rotation with the shaft 21 and connected parts and for longitudinal movement in relation thereto upon a cylindrical bearing 60 rigidly attached to the disc 59.

From the preceding description, it will be noted that the parts 21, 22, 24, 25, 26, 27 and 28 and the shafts 31ª and 41ª all rotate together, their masses serving as a flywheel and carrying along with them gears 31 and 41 as well as the valves V, valve links 56, valve levers 55 and the parts 58, 59 and 60. In the absence of working fluid, the gear 40 and the shaft 32 are free to rotate relatively to shaft 21. Furthermore, gear 40 is free to rotate independently of the other parts if pawls 49 are in ineffective position. However, if pawls 49 are in the position shown, it is clear that any rotation of the gear 40 causes the shaft 32 to rotate at half speed.

Assuming that working fluid is present but that it is free to circulate as desired, it is obvious that rotation of the shaft 21 will not impart rotation to shaft 32. In order to provide for various speed ratios between shafts 21 and 32 from the condition where shaft 32 is stationary to where it is operating at the same speed as shaft 21, or even at higher speeds or in a reverse direction, it is merely necessary to control the flow of the working fluid. This is accomplished by means of one or more valves such as the valve V.

Figure 2:
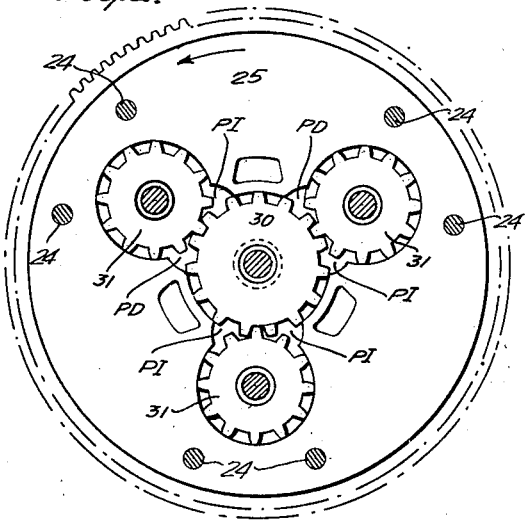
Fig. 2 is a vertical transverse section taken on the line 2—2 of Fig. 1 looking in the direction of the arrows.
Figure 3:
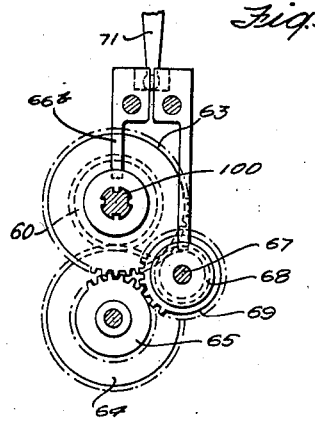
Fig. 3 illustrates any suitable supplementary mechanical transmission device being taken on line 3—3 of Fig. 1.

In neutral position or if it is desired to cause the shaft 32 to rotate at low speed relative to shaft 21, the working fluid is allowed to circulate freely from the delivery side of the device P (passage PD, Figs. 2 and 4) to the intake side of device P (PI, Figs. 2 and 4). The rotation of gears 31 around the gear 30 will therefore not have any effect upon gear 30 except that due to friction in the working fluid. Similarly, if the circulation between that part of device M which is designated MI (Fig. 4) and that part of device M designated ME (Fig. 4) is unobstructed, the gear 40 will not be turned, however, if this circulation is blocked, the free running of the gears 41 around the gear 40 is prevented and the gear 40 is forced to rotate practically at engine speed. This rotation of gear 40 causes the shaft 32 to be rotated at half speed through gears 42, 43 and 45, it being understood that pawls 49 are now in position to arrest the rotation of disc 48 whereby an increase in torque is secured by causing the reaction moment to be transmitted to the housing through pawls 49. In other words, the housing acts as a fulcrum and the gears 43 act as levers of the second class whereby the increase in torque is achieved. During this time, the gear 30 rotates at half the speed of the shaft 21 and in the same direction so that half of the mechanical and fluid friction energy of the device P, which would otherwise be entirely lost, is applied to the gear 30 and is thus beneficially utilized.

If now the valve V is moved to such a position that the delivery passages PD of the device P are connected to the intake passages MI of the device M and the exhaust passages ME of the device M are connected to the intake passages PI of device P, the device P will act as a pump and will pump the working fluid through the device M which now acts as a motor so that the gear 40 instead of being coupled for rotation at the same speed as shaft 21 is given a forward relative motion so that its speed is greater than engine speed and so that instead of a gear ratio of 2 to 1 we have a gear ratio of 1.5 to 1 assuming that the displacement volumes of device P and device M are equal. Under these conditions, the shaft 32 is driven at intermediate speed, which speed can be varied as desired by adjustment of the relative displacement of the devices P and M.

If now the flow of oil from the delivery passages PD of device P to the intake passages PI is cut off, the gear 30 will be rotated at the same speed as shaft 21, thus giving a gear ratio of 1:1, namely, direct drive, the valve being in the position shown in Fig. 7. During this time, it is desirable to either permit free rotation of gear 40 relative to shaft 21 or to release disc 48 for free rotation, in which event, all parts of the hydraulic transmission described will rotate as a unit, thus eliminating all sources of mechanical and hydraulic friction.

The means for controlling the flow of the working fluid to accomplish the above results will now be described:

In the form shown, one or more valves V are arranged preferably generally as shown in Fig. 1. While a single valve V may be used, it may be preferable to use the same number as there are gears 31, three in the form here shown. The valves may be arranged in parallel or so that each controls the connection between a pump section and one or more motor sections, or vice versa. The valve shown is in the form of a piston having an upper cylindrical bearing section $V_1$, an intermediate section $V_2$ and a lower section $V_3$. The sections $V_2$ and $V_3$ cooperate with valve ports $V_4$, $V_5$ and $V_6$ to cause the control of the circulation of the working fluid as described above. The passages from the delivery and intake side of the pump device P and the intake and exhaust side of the motor device M to said valve ports $V_4$, $V_5$ and $V_6$ may be located in the disc 26 and in part also in the discs 25 and 27. These passages are shown schematically in Fig. 4 where it will be seen that the passage PD is connected with valve port $V_5$, the passage MI is connected with the valve port $V_6$ and the passages PI and ME are connected together and to the valve port $V_4$.

In the position of the parts shown in Fig. 4, the valve is in its extreme inward position and the flow of the working fluid is not interfered with, with the result that the transmission is in a neutral condition, i. e. rotation of shaft 21 is not transmitted to shaft 32. Fig. 5 shows the valve in low speed position where it will be noted that the circulation through the pump P is short circuited, whereas circulation through the device M is prevented, so that the device M acts as a hydraulic coupling and causes the rotation of gear 40 with shaft 21 (low speed). In Fig. 6, the valve is in intermediate speed position so that fluid is pumped by device P through the device M causing intermediate speed relationship. Fig. 7 shows the valve in the position where both the device P and the device M are blocked, causing all of the parts to rotate as a unit. By reference to Fig. 1, it will be noted that when the valves V are in their extreme outward position, the disc 59 is forced to the extreme right so that it bears against the projection 50a of the pawls 49, causing them to be rocked clockwise and freeing the disc 48 for rotation. In order to reduce friction and wear the projection 50a may be provided with an anti-friction roller 50b.

The various required positions of the valve V may be secured by the centrifugal forces acting upon said valves so that as the engine reaches higher speeds, it will throw the valves outwardly against the action of the compression springs 55a and cause progressively higher gear ratios until the direct drive condition is secured. If a steep hill is encountered and the engine speed is reduced, the springs 55a will force the valves V inward to bring about intermediate speed operation or low speed operation depending upon the speed, as determined by the grade of the road and the engine throttle opening.

Instead of having the valves controlled by the speed of the power suppy shaft they may be controlled by the speed of the power delivery shaft and by any centrifugal or other speed responsive device. If controlled by the speed of the power delivery shaft the effect of the centrifugal force on the valves due to engine speed may be wholly or partly eliminated by counterweights or by arranging the valves for motion generally parallel to the axis of the power supply shaft. Furthermore, instead of adjusting the position of the valves by said centrifugal or other speed responsive means, this may be done by manual means such as the operating lever 59a (Fig. 1) connected for shifting the disc 59 as by slip collar 59b. By the use of suitable holding means for the lever 59a the device can be kept under full manual control or the transmission may be normally automatic in operation but subject to manual control at certain times such as by locking the lever in neutral or in, say, intermediate speed as when overtaking another vehicle on an upgrade.

As shown and described above, the mechanical gear ratio of the planetary arrangement is 2 to 1. It is, of cource, obvious that by having the bevel gears 42 and 45 of different diameters, other gear ratios may be secured. Furthermore, instead of using bevel gears other connections such as a spur gear planetary gearing could be used.

It is, of course, important that the hydraulic transmission described be completely filled with oil or other working fluid. In order to supply oil lost through leakage, evaporation or otherwise, it is desirable to provide an oil supply pump which pumps a small amount of oil from a reservoir into the transmission. The oil reservoir may be the usual crank case of the engine and either a special oil supply pump may be provided or the usual oil circulating pump of the engine may be utilized. Furthermore, in order that there may be no overheating of the oil, it is desirable to provide for a change of oil which may be accomplished by providing an overflow opening as from the intake side of P to the oil reservoir. A small amount of oil is thus permitted to escape, being replaced by oil delivered into the transmission by the oil supply pump. On downward slopes, the momentum of the vehicle will drive the engine and at such times an excessive amount of oil would be pumped to the reservoir. To provide against this, an automatic valve is preferably supplied which is operated by change of pressure in different parts of the transmission. These features are shown partly schematically in Fig. 8 wherein it will be noted that the engine crank shaft 21 has an oil supply passage 80 connecting with the oil supply pump 81 driven, for example, by the shaft 21 through any suitable gearing such as the worm gears 81a. While the oil supply pump may be driven by any suitable means it is preferred to have it operated by the power supply shaft rather than the power delivery shaft. Preferably located within the shaft 21 is a longitudinally slidable valve 83 which is formed with reduced portions 84 and 85. If required, a spring 86 may be provided to normally hold the valve 83 in its forward position. As shown, the crank shaft is also provided with passages 87, 88, 89, 90, 91 and 92. Connected to the passage 92 is a duct 92a leading to the crank case, which duct is of small dimensions so that it is capable of delivering only a small amount of oil to the oil reservoir. This oil is replaced by the oil supply pump 81 through passages 80, 88 and 91. The passage PD, as shown, is connected with passage 91, and passage PI through passage 87 is connected to the space at the other end of the piston valve 83. Assuming that the engine is driving the car, the piston valve 83 will remain in the position shown and the operation will be as just described. However, when the car starts to descend a slope and its momentum drives the motor, the pressure in PI will exceed that in PD with the result that the piston valve 83 will be forced to the right, thereby closing the connection between 89 and 92 and thus preventing an undue discharge of oil to the reservoir. In the form shown, the connection between passages 80 and 91 is also closed so that oil is no longer delivered from the oil supply pump to the transmission. If desired, a relief valve may be supplied to permit the return to the crank case of the oil now being pumped by the pump 81.

It will be noted that the oil pumped by pump 81 is delivered to the delivery side PD of the device P so that when the valve V is in the position shown in Fig. 7 the shaft 32 instead of being driven merely at engine speed is driven at a somewhat higher speed. The extent of this "over-drive" is dependent, of course, upon the displacement of the pump 81. At this time the device P therefore acts not only as a hydraulic clutch but also to some extent as a motor. Therefore the energy delivered by the pump 81 is not lost but is utilized and is transmitted to the shaft 32.

The described hydraulic transmission provides only three definite steps. However, since one can, by the use of the known gear pump devices consisting of three or four gears, shut off or turn on the oil stream delivered by individual gear pairs, a number of stages can be provided between direct drive and low speed drive. By permitting the motor gears M to act as a pump and causing the oil delivered thereby to be led to that side of the device P which usually acts as the suction side (PI), still lower ratios may be provided, even to the extent of a 1 to 0 ratio, thus providing a neutral position. However, if the device P receives less oil than the amount usually delivered per rotation of the flywheel, low speed forward motion of the shaft 32 is effected. This can be accomplished by having only one or two of the gears of the device P utilized or by constructing the device P of smaller dimensions than the device M, as for example by using narrower gears. The number of these low gear ratios can be still further increased by also controlling the flow of oil stepwise, that is, from one or more of the gear wheels. In fact, even a reverse motion can be accomplished in this way if through partial use of the wheels of M its displacement is smaller than the displacement of the device P. In a similar manner, also increased speed ratios may be achieved, that is, the shaft 32 may be caused to rotate more rapidly than shaft 21 by feeding an appropriately small supply of oil into the pressure side of device P (which now acts as a motor) to which oil is delivered from the corresponding parts of the device M, which at this time acts as a pump. At this time, the locking pawls 49 must be effective. If desired, a small special pump may be provided for this purpose, possibly located externally. Such an "over-drive" is produced by pump 81, described hereinafter.

While the device P has been referred to as a pump it may sometimes act as a motor, and while the device M has been referred to as a motor it may on occasion act as a pump. Both P and/or M may on occasion also act as couplings. For want of a better term these devices have each been designated as a hydraulic displacement device.

The hydraulic transmission described can also find application as a "free wheeling" transmission. For this purpose, it is only necessary to provide appropriate check valves which permit free circulation of the oil upon the occurrence of a reverse torque. These valves need only be made of small area if the piston valve V has at this time opened the main passages.

The details of construction of the hydraulic transmission are immaterial. For example, instead of using gears for the oil pumps and oil motors, other positive displacement devices such as piston pumps may be utilized.

The hydraulic transmission described above may, of course, be used in connection with a mechanical transmission to achieve either direct drive from the power delivery shaft 32 to the propeller shaft 100 or to achieve a reduced drive or a reverse. Any suitable mechanical transmission may be utilized. In the drawings, this may consist of a gear member 60 attached to the rearward end of shaft 32, which gear 60 is continually in mesh with the gear 64 suitably mounted in the transmission housing. To said gear is rigidly connected a gear 65 as shown. Splined to the propeller shaft 100 is a gear member 66 having spur gear teeth 63 and internal teeth 62 which may cooperate with external teeth 61 on the member 60. It will be noted that if the gear member 66 is moved forwardly, the teeth 61 and 62 will interengage, causing the shaft 32 to drive the shaft 100 directly. If it is moved to the right, the gear teeth 63 will engage with the teeth 65, thus causing motion of shaft 100 in a forward direction but at a lower speed than that of shaft 32. This sliding motion may be secured by a manual shifter member 66b of usual construction operating in the groove 66a. In order to provide for a mechanical reverse, a gear member consisting of gears 68 and 69 is slidably mounted upon the supporting shaft 67 in such a way that when in normal position, said gear member does not rotate. However, when moved forwardly, its smaller gear 68 will mesh with the teeth 63 and its larger gear 69 will mesh with the teeth 65. It will be noted that in this position of the parts the shaft 100 will be rotated in a direction opposite to that of shaft 32 and at a lower speed. The reverse gears are controlled by the usual shifter plate 70 operating in groove 70a. The shifter plates 66b and 70 may be operated by any suitable means such as the lever 71.

While I have herein shown and described only certain embodiments of certain features of my present invention it is to be understood that they are to be regarded merely as illustrative and that I do not intend to limit myself thereto except as may be required by the following claims.

I claim:

1. In a hydraulic power transmission, a power supply shaft, a coaxial power delivery shaft, a hydraulic displacement device connected between said power supply and power delivery shafts for rotating the latter in the same direction at the same speed and a second hydraulic displacement device connected between said power supply shaft and said power delivery shaft through gearing for rotating said power delivery shaft in the same direction at a different speed.

2. In a hydraulic power transmission, a power supply shaft, a coaxial power delivery shaft, a hydraulic displacement device connected between said power supply and power delivery shafts for rotating the latter in the same direction at the same speed and a second hydraulic displacement device connected between said power supply shaft and said power delivery shaft through gearing for rotating said power delivery shaft in the same direction at a different speed, working fluid and passages therefor connecting said devices.

3. In a hydraulic power transmission, a power supply shaft, a coaxial power delivery shaft, a hydraulic displacement device connected between said power supply and power delivery shafts for rotating the latter in the same direction at the same speed and a second hydraulic displacement device connected between said power supply shaft and said power delivery shaft through gearing for rotating said power delivery shaft in the same direction at a different speed, working fluid and passages therefor connecting said devices, and means for controlling the flow of the working fluid.

4. In a hydraulic power transmission, a power supply shaft, a coaxial power delivery shaft, a hydraulic displacement device connected between said power supply and power delivery shafts for rotating the latter in the same direction at the same speed and a second hydraulic displacement device connected between said power supply shaft and said power delivery shaft for rotating said power delivery shaft in the same direction at a different speed, working fluid and passages therefor connecting said devices, and means to short circuit said devices.

5. In a hydraulic power transmission, a power supply shaft, a coaxial power delivery shaft, a hydraulic displacement device connected between said power supply and power delivery shafts for rotating the latter in the same direction at the same speed and a second hydraulic displacement device connected between said power supply shaft and said power delivery shaft through gearing for rotating said power delivery shaft in the same direction at a different speed, working fluid and passages therefor connecting said hydraulic displacement devices, and means for controlling the flow of the working fluid so as at will to short circuit one of said hydraulic displacement devices and to block flow through the other hydraulic displacement device.

6. In a hydraulic power transmission, a power supply shaft, a power delivery shaft, a hydraulic displacement device connected between said power supply and power delivery shafts and a second hydraulic displacement device connected between said power supply shaft and said power delivery shaft through gearing for rotating said power delivery shaft in the same direction, working fluid and passages therefor connecting said devices, and means for controlling the flow of the working fluid so as at a certain time to short circuit said first device and to block flow through said second device and at another time to block flow through said first device.

7. In a hydraulic power transmission, a power supply shaft, a power delivery shaft, a hydraulic displacement device connected between said power supply and power delivery shafts and a second hydraulic displacement device connected between said power supply shaft and said power delivery shaft through gearing, working fluid and passages therefor connecting said devices, and means for controlling the flow of the working fluid so as at a certain time to short circuit said first device and to block flow through said second device and at another time to block flow through said first device, and at still another time to cause one of said devices to pump fluid through the other device.

8. In a hydraulic power transmission, a power supply shaft, a power delivery shaft, a hydraulic displacement device connected between said power supply and power delivery shafts and a second hydraulic displacement device connected between said power supply shaft and said power delivery shaft through gearing, working fluid and passages therefor connecting said devices, and means for controlling the flow of the working fluid so as at certain times to short circuit said first device and to block flow through said second device and at another time to block flow through said first device, and at still another time to cause the said first device to pump fluid through said second device.

9. In a hydraulic power transmission adapted to control the delivery of power from an engine, a flywheel carried by the power supply shaft of said engine, a gear wheel hydraulic displacement device located within said flywheel and comprising a gear coaxial with said shaft and a gear meshing therewith and carried by the flywheel, and a second hydraulic displacement device also located within said flywheel and connected to said coaxial gear for rotating said coaxial gear in the same direction at a speed lower than that of the power supply shaft.

10. In a hydraulic power transmission, a power supply shaft, a power delivery shaft, a hydraulic device operating upon working fluid to cause said power supply shaft to drive said power delivery shaft, a fluid reservoir, a fluid exit passage from said transmission to said reservoir, a fluid supply pump for pumping fluid from said reservoir into said transmission, and a valve to control said fluid exit passage said valve being operable by differences of fluid pressure in the transmission.

11. In a hydraulic power transmission, a power supply shaft, a power delivery shaft, a hydraulic displacement device connected between said power supply and power delivery shafts and a second hydraulic displacement device connected between said power supply shaft and said power delivery shaft through gearing, working fluid and passages therefor, and means for controlling the flow of the working fluid, said controlling means being controlled by speed responsive means.

12. In a hydraulic power transmission, a power supply shaft, a power delivery shaft, a hydraulic displacement device connected between said power supply and power delivery shafts and a second hydraulic displacement device connected between said power supply shaft and said power delivery shaft through gearing, working fluid and passages therefor, and means to short circuit said devices, said controlling means being controlled by speed responsive means.

13. In a hydraulic power transmission, a power supply shaft, a power delivery shaft, a hydraulic displacement device connected between said power supply and power delivery shafts and a second hydraulic displacement device connected between said power supply shaft and said power delivery shaft through gearing, working fluid and passages therefor, and controlling means to short circuit one of said devices and to block flow through the other device, said controlling means being controlled by speed responsive means.

14. In a hydraulic power transmission, a power supply shaft, a power delivery shaft, a hydraulic device connected between said power supply and power delivery shafts and a second hydraulic displacement device connected between said power supply shaft and said power delivery shaft through gearing, working fluid and passages therefor, and means for controlling the flow of the working fluid so as at a certain time to short circuit said first device and to block flow through said second device and at another time to block flow through said first device, said controlling means being controlled by speed responsive means.

15. In a hydraulic power transmission, a power supply shaft, a power delivery shaft, a hydraulic displacement device connected between said power supply and power delivery shafts and a second hydraulic displacement device connected between said power supply shaft and said power delivery shaft through gearing, working fluid and passages therefor, and means for controlling the flow of the working fluid so as at a certain time to short circuit said first device and to block flow through said second device and at another time to block flow through said first device, and at still another time to cause one of said devices to pump fluid through the other device, said controlling means being controlled by speed responsive means.

16. In a hydraulic power transmission, a power supply shaft, a power delivery shaft, a hydraulic displacement device connected between said power supply and power delivery shafts and a second hydraulic displacement device connected between said power supply shaft and said power delivery shaft through gearing, working fluid and passages therefor, and means for controlling the flow of the working fluid, said controlling means being controlled by speed responsive means, and manual means for controlling said speed responsive controlling means.

17. In a hydraulic power transmission, a power supply shaft, a coaxial power delivery shaft, a hydraulic displacement device connected between said power supply and power delivery shafts for rotating the latter in the same direction at the same speed and a second hydraulic displacement device connected between said power supply shaft and said power delivery shaft through gearing, and means for disabling said gearing, so that both hydraulic displacement devices may be effective at the same time.

18. In a hydraulic power transmission, a power supply shaft, a coaxial power delivery shaft, a hydraulic displacement device connected between said power supply and power delivery shafts for rotating the latter in the same direction at the same speed and a second hydraulic displacement device connected through gearing, working fluid and passages therefor, means for controlling the flow of the working fluid so as at will to short circuit one of said devices and to block flow through the other device, and means for disabling said gearing so that both hydraulic displacement devices may be effective at the same time.

19. In a hydraulic power transmission, a power supply shaft, a power delivery shaft, a hydraulic displacement device connected between said power supply and power delivery shafts and a second hydraulic displacement device connected between said power supply shaft and said power delivery shaft through gearing, working fluid and passages therefor, means for controlling the flow of the working fluid so as at will to short circuit one of said devices and to block flow through the other device, and means for disabling said gearing, said displacement means being operated in coordination with said fluid controlling means.

20. In a hydraulic power transmission, a power supply shaft, a power delivery shaft, a hydraulic displacement device connected between said power supply and power delivery shafts and a second hydraulic displacement device connected between said power supply shaft and said power delivery shaft through gearing, working fluid and passages therefor, means for controlling the flow of the working fluid, and means for disabling and enabling said gearing, said displacement means being operated in coordination with said fluid controlling means.

21. In a hydraulic power transmission, a power supply shaft, a coaxial power delivery shaft, a hydraulic displacement device connected between said power supply and power delivery shafts for rotating the latter in the same direction and at the same speed and a second hydraulic displacement device connected between said power supply shaft and said power delivery shaft through gearing for rotating said power delivery shaft in the same direction at a different speed, working fluid and passages therefor connecting said devices, and manual means for controlling the flow of the working fluid.

22. In a power transmission, a driving shaft, a driven shaft, a hydraulic displacement device comprising an element driven by said driving shaft, and a second element connected for driving said driven shaft, valve means adapted at certain times to block delivery of fluid from the delivery side of said device whereby the driving and driven elements of said device are caused to rotate at the same speed, and pump means driven by said driving shaft for pumping fluid into the normal delivery side of said hydraulic displacement device at other times for causing said driven element to rotate at a higher speed than that of the driving element.

23. In a power transmission, a driving shaft, a driven shaft, a hydraulic displacement device comprising an element driven by said driving shaft and a second element connected for driving said driven shaft, valve means adapted at certain times to block delivery of fluid from the delivery side of said device whereby the driving and driven elements of said device are caused to rotate at the same speed, and pump means operated by the difference in speed between the driving and driven shafts for pumping fluid into the normal delivery side of said hydraulic displacement device at other times for causing said driven element to rotate at a speed higher than that of the driving element.

24. In a power transmission, a driving shaft, a driven shaft, clutch means for clutching said shafts together, an intermediate member connected to drive said driven shaft through reduction gearing, means for causing said clutch to be disengaged and said intermediate member to be connected to the driving shaft for rotation therewith, whereby the driven shaft is rotated at a lower speed than the driving shaft, and means effective at certain times and operated as an incident to the difference in speed between the driving and driven shafts for causing said intermediate member to be driven at a speed higher than that of the driving shaft, whereby the driven shaft is rotated at an intermediate speed.

25. In a power transmission, a driving shaft, a driven shaft, a clutch means for clutching said shafts together, an intermediate member connected to drive said driven shaft through reduction gearing, means for causing said clutch to be disengaged and said intermediate member to be connected to the driving shaft for rotation therewith, whereby the driven shaft is rotated at a lower speed than the driving shaft, and means effective at certain times for causing said intermediate member to be driven at a speed higher than that of the driving shaft whereby the driven shaft is rotated at an intermediate speed, said last mentioned means being actuated by the difference in speed between the driving and driven shafts.

26. In a hydraulic power transmission, a power supply shaft, a power delivery shaft, a hydraulic displacement device connected between said power supply and power delivery shafts and a second hydraulic displacement device connected between said power supply shaft and an intermediate member, and a drive connection between said intermediate member and said power delivery shaft for rotating said power delivery shaft in the same direction as said intermediate member.

27. In a hydraulic power transmission, a power supply shaft, a power delivery shaft, a hydraulic displacement device connected between said power supply and power delivery shafts and a second hydraulic displacement device connected between said power supply shaft and an intermediate member, and a drive connection between said intermediate member and said power delivery shaft for rotating said power delivery shaft in the same direction as said intermediate member, working fluid and passages therefor connecting said devices.

28. In a hydraulic power transmission, a power supply shaft, a power delivery shaft, a hydraulic displacement device connected between said power supply and power delivery shafts and a second hydraulic displacement device connected between said power supply shaft and an intermediate member, and a drive connection between said intermediate member and said power delivery shaft for rotating said power delivery shaft in the same direction as said intermediate member, working fluid and passages therefor connecting said devices, and means for controlling the flow of the working fluid.

29. In a hydraulic power transmission, a power supply shaft, a power delivery shaft, a hydraulic displacement device connected between said power supply and power delivery shafts and a second hydraulic displacement device connected between said power supply shaft and an intermediate member, and a drive connection between said intermediate member and said power delivery shaft for rotating said power delivery shaft in the same direction as said intermediate member, working fluid and passages therefor connecting said devices, and means to short circuit said devices.

30. In a hydraulic power transmission, a power supply shaft, a power delivery shaft, a hydraulic displacement device connected between said power supply and power delivery shafts and a second hydraulic displacement device connected between said power supply shaft and an intermediate member, and a drive connection between said intermediate member and said power delivery shaft for rotating said power delivery shaft in the same direction as said intermediate member, working fluid and passages therefor connecting said hydraulic displacement devices, and means for controlling the flow of the working fluid so as at will to short circuit one of said hydraulic displacement devices and to block flow through the other hydraulic displacement device.

31. In a power transmission, a driving member, a driven member, a hydraulic displacement device comprising an element driven by said driving member and a second element connected for driving said driven member, valve means adapted at certain times to block delivery of fluid from the delivery side of said device whereby the driving and driven elements of said device are caused to rotate at the same speed, and pump means for pumping fluid into the normal delivery side of said hydraulic displacement device at other times for causing said driven element to rotate at a higher speed than that of the driving element, the connecting means between said second element and said driven member comprising gearing.

32. A power transmission according to claim 17 wherein said gearing comprises a planetary gear element revolvable with said power delivery shaft and meshing with two sun gears, one of which is rotated by said second hydraulic displacement device and the other of which is, at will, held against rotation.

33. A power transmission according to claim 17 wherein said gearing comprises a planetary gear element revolvable with said power delivery shaft and meshing with two sun gears, one of which is rotated by said second hydraulic displacement device and the other of which is, at will, held against rotation and wherein the means for disabling said gearing comprises means for disabling the holding means for said second sun gear.

34. A power transmission according to claim 19 wherein said gearing comprises a planetary gear element revolvable with said power delivery shaft and meshing with two sun gears, one of which is rotated by said second hydraulic displacement device and the other of which is, at will, held against rotation.

35. A power transmission according to claim 19 wherein said gearing comprises a planetary gear element revolvable with said power delivery shaft and meshing with two sun gears, one of which is rotated by said second hydraulic displacement device and the other of which is, at will, held against rotation and wherein the means for disabling said gearing comprises means for disabling the holding means for said second gear.

36. A power transmission according to claim 26 wherein said drive connection comprises a planetary gear element revolvable with said power delivery shaft and meshing with two sun gears, one of which is rotated by said intermediate member and the other of which is, at will, held against rotation.

37. A power transmission according to claim 31 wherein said gearing comprises a planetary gear element revolvable with said driven member and meshing with two sun gears, one of which is rotated by said second member and the other of which is, at will, held against rotation.

38. A power transmission according to claim 1 wherein said gearing comprises a planetary gear element revolvable with said power delivery shaft and meshing with two sun gears, one of which is rotated by said second hydraulic displacement device and the other of which is, at will, held against rotation.

39. Drive mechanism of the character described, comprising a drive shafe, a driven shaft, a variably movable transfer gear between the drive shaft and the driven shaft, fluid-pressure means operated by said transfer gear, fluid-stoppage means for controlling said fluid-pressure means, and fluid-pressure means for controlling the movement of said transfer gear by recirculating fluid into the first-named fluid-pressure means.

40. Drive mechanism of the character described, comprising a drive shaft, a driven shaft, a variably movable transfer gear between said drive shaft and said driven shaft, fluid-pressure means for controlling said transfer gear, a clutch having one element connected to said drive shaft and another element connected to said driven shaft, and centrifugally-operated means for engaging said clutch.

41. Drive mechanism of the character described, comprising a drive shaft, a driven shaft, a transfer gear therebetween, and means for increasing torque, said means including pump-means having one element connected to said drive shaft and another connected to said transfer gear, and another pump having one element connected to said drive shaft, said pump-means being of unequal fixed displacement.

42. In drive mechanism shafts to be connected and means for connecting said shafts and for increasing torque-ratio, said means including gear elements connected to separate shafts, two sets of pump elements, one set having greater capacity than the other, conduits connecting the two sets of pump elements, and variable means to control recirculation therethrough.

43. In variable gearing mechanism, a drive shaft, a driven shaft, fluid-pump means between said shafts, valve-means for controlling same, a hollow shaft, another pump-means between said drive shaft and said hollow shaft, valve-means for controlling the same, epicyclic gearing means between said hollow shaft and said driven shaft, means to operate said valve means for locking a selected part of said epicyclic means, and optionally controllable ratchet-means to hold part of said epicyclic means stationary.

44. In variable gearing mechanism, a drive shaft, a driven shaft, fluid-pump means between said shafts, valve-means for controlling same, a hollow shaft, another pump-means between said drive shaft and said hollow shaft, valve-means for controlling the same, epicyclic gearing means between said hollow shaft and said driven shaft, and manual and centrifugal means to operate said valve means for locking a selected part of said epicyclic means.

45. In a hydraulic power transmission, a power supply shaft, a power delivery shaft, a torque converting hydraulic device operating upon working fluid to cause said power supply shaft to drive said power delivery shaft at the same or different speeds, a fluid reservoir, a fluid exit passage from said transmission to said reservoir, a fluid supply pump for pumping fluid from said reservoir into said transmission and through said hydraulic device, and a valve to control said fluid exit passage.

46. In a hydraulic power transmission, a power supply shaft, a power delivery shaft, a torque converting hydraulic device operating upon working fluid to cause said power supply shaft to drive said power delivery shaft at the same or different speeds, a fluid reservoir, a fluid exit passage from said transmission to said reservoir, a fluid supply pump for pumping fluid from said reservoir into said transmission and through said hydraulic device, and a valve to control said fluid exit passage, said valve being operated at times by the pressure of the working fluid.

47. In a hydraulic power transmission, a power supply shaft, a power delivery shaft, a torque converting hydraulic device operating upon working fluid to cause said power supply shaft to drive said power delivery shaft at the same or different speeds, a fluid reservoir, a fluid exit passage from said transmission to said reservoir, a fluid supply pump for pumping fluid from said reservoir into said transmission and through said hydraulic device, and a valve to control said fluid exit passage, said valve being operated at times by change in the pressure of the working fluid, resulting from reversal of torque in the transmission.

HANS THOMA.